United States Patent Office 3,299,104
Patented Jan. 17, 1967

3,299,104
CERTAIN STEROID N-BIS-(HALOETHYL)-
CARBAMATES
Hans Jakob Fex, Knut Bertil Högberg, Imre Könyves, and Paul Hans Otto Joseph Kneip, all of Halsingborg, Sweden, assignors to Aktiebolaget Leo, Halsingborg, Sweden
No Drawing. Filed Apr. 1, 1964, Ser. No. 356,666
Claims priority, application Great Britain, Apr. 9, 1963, 14,160/63
19 Claims. (Cl. 260—397.4)

The present invention relates to certain novel esters of certain estrogenic, androgenic and corticoid steroid hormones, which esters show an anti-tumour activity against Ehrlich's ascites tumours in mice. The acid moiety of these esters are acid residues of N-bis-(β-haloethyl)-carbamic acids of the formula:

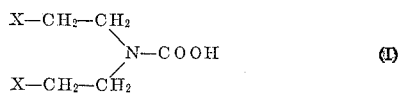

(I)

wherein X represents chlorine or bromine. The estrogenic, androgenic and corticoid steroid hormones that are used as starting materials for the production of the said esters are simply termed "steroids" in the following. They all contain one or more hydroxyl groups and may contain further substituents such as ether groups, halogen atoms, and alkyl groups. One or more of the hydroxyl groups may be previously esterified by introducing an acyl group of an unobjectionable acid, as represented by aliphatic, cycloaliphatic, and aromatic carboxylic acids, in particular mono- and dibasic carboxylic acids, as well as inorganic acids, such as phosphoric acids, phosphorous acids, sulfuric acids and the like polybasic acids, leaving at least one hydroxyl group intact.

More particularly, the invention relates to mono- and polyesters of estrogenic, androgenic and corticoid steroid hormones selected from the group consisting of estra-1,3,5 (10)-triene 17β-ol (3-desoxy-estradiol), estra-1,3,5 (10)-triene-3,17β-diol (17β-estradiol), estra-1,3,5 (10)-triene-3,17α-diol (17α-estradiol), estra-1,3,5 (10)-triene-3,17β-diol-16-one (16-keto-estradiol), estra-1,3,5 (10)-triene-3,16α, 17β-triol (estriol), 17α-ethynyl-estra-1,3,5 (10)-triene-3,17β-diol (17α-ethynyl-17β-estradiol) estra-1,3,5 (10)-triene-3,17β-diol-3-methylether (17β-estradiol-3-methylether), and estra-1,3,5 (10)-triene-3,17β-diol-17-methylether (17β-estradiol-17-methylether), and androstane - 3α, 17β - diol, androstane - 3α - ol-17-one (androsterone), androstane - 3β - ol - 17 - one (epiandrosterone), androst - 5 - ene - 3β-ol-17-one (dehydroepiandrosterone), pregnane-3α-20α-diol (pregnanediol), etiocholane-3α-ol-17-one (etiocholanolone), pregn-5-ene-3β-ol-20-one pregnenolone), 4-chloro-19-nor-androst-4-ene-17β-ol-3-one (4-chloro-19-nortestosterone), pregn - 4-ene-17α,21-diol-3,11, 20-trione (cortisone), pregn-4-ene-11β,17α,21-triol-3,20-dione (cortisol), pregn-4-ene-11β,21-diol-3,20-dione (corticosterone), pregn-4-ene-21-ol - 3,11,20-trione (dehydrocorticosterone), pregn - 4 - ene-21-ol-3,20-dione (desoxycorticosterone), pregna - 1,4 - diene - 17α,21-diol-3,11,20-trione (prednisone), pregna-1,4-diene-11β,17α,21-triol-3, 20-dione (prednisolone), 6α-methylpregna-1,4-diene-11β, 17α,21 - triol - 3,20 - dione (6α-methylprednisolone), 9α-fluoro-pregn-4-ene-11β,17α,21-triol-3,20-dione (9α-fluorocortisol), 6α-9α-difluoro - pregn-1,4-diene-11β,16α,17α,21-tetrol-3,20-dione (6α,9α-difluoro-prednisolone), 16α-methyl-9α-fluoro-pregna-1,4-diene - 11β,17α,21-triol-3,20-dione (16α-methyl-9α-fluoro-prednisolone), and the above-mentioned partial esters of these.

The esters of the invention are useful against Ehrlich's ascites tumor in mice, where a certain hormonal effect is desirable. This hormonal effect, being inherent in the steroid moiety, can be regulated by introducing at a remaining hydroxyl group in the steroid part of the novel esters, an acid residue of the kind which is well known in the art for regulating, modifying or protracting the effect of steroid hormones. The acids used for this purpose are the same as the unobjectionable organic acids named above, and preferably such of not more than 20 carbon atoms in the molecule.

The most promising compounds containing the estradiol nucleus are estradiol - 3 - N-bis-(β-chloroethyl)-carbamate, estradiol-3-N-bis - (β-chloroethyl)-carbamate-17-phosphate, estradiol-3-N-bis-(β - chloroethyl) - carbamate 17-propionate, estradiol-3-phosphate-17-N-bis-(β - chloroethyl) - carbamate, estradiol - 3,17-bis-[N-bis-(β-chloroethyl)]-carbamate, estradiol - 17-N-bis-(β - chloroethyl)-carbamate, estradiol-3-N-bis-(β-chloroethyl) - carbamate-17-acetate, estradiol-3-N-bis-(β-chloroethyl) - carbamate-17-β(p-propoxyphenyl)-propionate, estradiol-3-acetate-17-N-bis-(β-chloroethyl) - carbamate, estradiol-3-N-bis-(β-chloroethyl)-carbamate-17-trimethylacetate, estradiol-17-N - bis-(β-bromoethyl)-carbamate, estradiol-3-acetate-17-N-bis-(β-bromoethyl) - carbamate, estradiol-[3-N-bis-(β-chloroethyl)-17N-bis-(β-bromoethyl)]-dicarbamate.

The result of the three estradiol compounds first mentioned above as tried against Ehlich's ascites tumour is shown in the following Example 21.

Another object of the invention is to provide a process of preparing the above-mentioned esters. When referring below to "esterification according to the invention" what is meant is the introduction of acid residues of Compound I into the steroid nucleus. The said esterification can be performed at one or several positions in the steroid nucelus, as desired.

In a preferred embodiment of the process of the invention using as starting materials:

(a) An estrogenic, androgenic or corticoid steroid molecule as defined hereinbefore with or without ester or ether groups or other substituents at the nucleus, such as halogen atoms or alkyl groups, and containing a free hydroxyl group, and (b) An N-bis (β-haloethyl)-amine of the general formula:

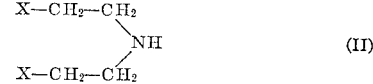

(II)

wherein X is chlorine or bromine, one of the starting materials is treated with COY$_2$, wherein Y is chlorine or bromine, whereupon the resulting haloformyl derivative is reacted with the other starting material, the resulting steroid ester being isolated and/or, if desired, being subsequently esterified with a compound selected from functionally reactive derivatives of aliphatic, cycloaliphatic and aromatic carboxylic acids, in particular mono- and dibasic carboxylic acids, as well as inorganic acids, such as phosphoric acids, phosphorous acid, sulfuric acid or the like inorganic polybasic acids to introduce at least one further ester group, the resulting ester being then isolated.

In the case of starting with an amine of Formula II, the preferred amine is the one, in which X represents chlorine.

The subsequent esterification process to introduce the acyl group of a polybasic inorganic acid is of particular interest, because it will generally result in products which may be made to dissolve in water to form aqueous solutions with a pH at or about the neutral point.

The esters of the invention may be administered, conveniently by the usual routes used for the administration of steroids, for example in the form of tablets, capsules or in the form of the usual sterile solutions or suspensions for injection. The results upon administration have so far been very promising.

The esters of the invention may be employed in aqueous suspension or solution, or in oil solution or suspension, as well as dispersed in physiological saline, but various preparations can also be advantageously compounded which contain the active substance along with liquid or solid diluents. Solid preparations for extemporaneous dilution as well as for direct usage (a.g., as implantates) may be formulated to contain various buffering agents as well as local anesthetics and other medicinal agents such as antibiotics, hypnotics, analgesics, etc., and inorganic salts to afford desirable pharmacological properties to the composition.

Doses of the order of 10 to 1000 mg./kg. daily and especially 50–400 mg./kg. daily of the esters of the present invention are highly effective in inhibiting tumours in animals. Since the esters of the invention are stable and widely compatible, they may be administered in solution or suspension in a variety of pharmacologically acceptable vehicles, including water, propylene glycol, diethyl, carbonate, glycerol, and oils such as peanut oil or sesame oil. Suitable formulations for compositions are as follows:

Tablet (implantate):
  Estradiol - 3 - N-bis-(β-chloroethyl)-carbamate, mg. ---------------------------------- 100
  Lactose, mg. ---------------------------- 100
  Polyvinylpyrrolidone, mg. ---------------- 4
Oil solution for injection:
  Estradiol - 3 - N-bis-(β-chloroethyl)-carbamate-17-propionate, mg. ------------------ 250
  Benzyl benzoate, mg. -------------------- 15
  Peanut oil to make, ml. ----------------- 5
Aqueous suspension for injection:
  Estradiol - 3 - N-bis-(β-chloroethyl)-carbamate, mg. -------------------------------- 250
  Polyoxyethylene sorbitan monostearate (Tween 80, Atlas), mg. --------------------- 20
  Benzyl alcohol, mg. --------------------- 45
  Carboxymethyl-cellulose, mg. ------------ 15
  Distilled water to make, ml. ------------ 5
Water solution for injection (can be lyophilized):
  Estradiol - 3 - N-bis-(β-chloroethyl)-carbamate-17-phosphate, mg. ------------------ 250
  Soduim hydroxide to make pH ------------ 7.0
  Distilled water to make, ml. ------------ 10

Any other pharmaceutical adjuvants may be used provided that they are compatible with the active ingredient.

In addition to the conventional intramuscular, subcutaneous, intravenous, and intraperitoneal administration routes, these compounds may also be employed in conjunction with perfusion procedures, wherein the tumour site is isolated from the main circulatory system for treatment.

As stated hereinbefore, the esterification according to the present invention may be accomplished using as starting materials a selected steroid, as hereinbefore defined, and a N-bis-(βhaloethyl)-amine, having the general formula:

(II)

wherein X is as defined above. One of the starting materials is treated with COY$_2$, wherein Y represents chlorine or bromine, whereupon the resulting haloformyl derivative is reacted with the other starting material and the resulting steroid ester (IV) is isolated (see Charts I and II below), if desired after esterification with a functionally reactive derivative of a pharmacologically unobjectionable acid as defined above.

Chart I

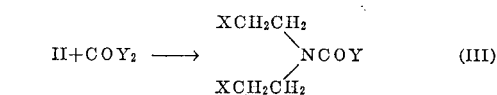

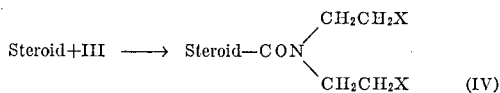

Chart II

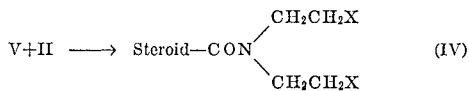

The order of the addition of the reactants may influence the order at which introduction of the ester groups takes place at different positions in the steroid molecule. Thus using the order of addition shown in Chart I will favour the formation of an ester group at a phenolic hydroxyl group (such as the 3-OH group in estradiol) and at a hydroxyl group in 21-position in the steroid nucleus. By reversing the order of addition as in Chart II, the formation of an ester group at a hydroxyl group in 3α, 3β and 17 positions in the steroid nucleus is favoured.

Some of the intermediate chloroformyl compounds (V) are novel. Their melting points (M.P.) and optical rotations ($[\alpha]_D$) are given below:

| Compound | M.P.° C. | $[\alpha]_D^\circ$ |
|---|---|---|
| 17-chloroformate of estradiol-17β | 123–124 | +71.2 |
| 17-chloroformate of estradiol-17β-3-acetate | 112.5–114 | +64.1 |
| 3,17-dichloroformate of androstane-3α,17β-diol | 147–147.5 | +32.6 |
| 17-chloroformate of estradiol-17β-3-N-bis-(β-(chloroethyl)-carbamate | 110–111.5 | +44.8 |
| 3-chloroformate of androstan-3α-ol-17-one | 119.5–120.5 | +84.3 |
| 3-chloroformate of androst-5-ene-3β-ol-17-one | 126–127 | +12.5 |

It is convenient to carry out the esterification of the invention in the presence of an acid-binding agent. As examples of such can be mentioned tertiary amines, such as anhydrous triethylamine, pyridine, quinoline and dimethylaniline, but also an excess of Compound II can serve as acid-binding agent.

It is also convenient to carry out the present esterification in the presence of a solvent. Where the above-mentioned tertiary amines are present in excess, they may act as solvents; but otherwise an inert solvent, such as anhydrous chloroform, benzene, toluene, xylene, tetrahydrofurane and dioxane, has been found very convenient. Other inert solvents, such as high-boiling ethers, are also satisfactory.

The temperature is preferably kept at from about −20° C. up to about the boiling point of the mixture.

As functionally reactive derivatives of the pharmacologically unobjectionable acids mentioned above are preferably used acid anhydrides or acid chlorides, usually in an anhydrous, acid-binding solvent, such as triethylamine, pyridine, quinoline, dimethylaniline or the like, at a temperature of preferably from −20° C. to about the boiling point of the mixture.

The following examples are given by way of illustration only and are not to be construed as limiting.

EXAMPLE 1

*Estradiol-3-N-bis(β-chloroethyl)-carbamate*

A solution in dry benzene of 82 g. of bis-(β-chloroethyl)-amine freshly liberated from its hydrochloride is added gradually to a solution of 36 g. of carbonyl chloride in benzene at a temperature below 10° C. The mixture is mechanically stirred for three hours, the precipitate of bis-(β-chloroethyl)-amine hydrochloride is removed by filtration, and the benzene is distilled off on a water bath. The residue is distilled in vacuo, and the N-chloroformyl-bis- (β-chloroethyl)-amine is obtained as a pale yellow oil with a B.P. of 114–116° C./1 mm. Hg.

To a solution of 16.35 g. of estradiol in 75 ml. of dry pyridine, 21.00 g. of the above-mentioned chloroformyl-bis-(β-chloroethyl)-amine are added while stirring and cooling with ice-water.

The reaction mixture is allowed to stand at room temperature for 60–70 hours under the exclusion of air humidity. Then the excess of the chloroformyl compound is hydrolyzed with crushed ice. Ethyl acetate is added and, after shaking, the ethyl acetate solution is separated and washed with water, dried over sodium sulphate and evaporated in vacuo to dryness.

The residue is the 3-N-bis(β-chloroethyl)-carbamate of estradiol. The compound melts at 101–103° C. after recrystallization from isopropyl ether+hexane (1:1).

$[\alpha]_D^{20°\,C.} = +44.8°$ (c.=1.0 in dioxane)

EXAMPLE 2

*Estradiol-3-N-bis(β-chloroethyl)-carbamate-17-acetate*

Analogously to Example 1, estradiol-3-N-bis-(β-chloroethyl)-carbamate-17-acetate is obtained from 6.28 g. of estradiol-17-acetate and 6.03 g. of N-chloroformyl-bis-(β-chloroethyl)-amine. This compound melts at 101–102° C. after recrystallization from methanol.

$[\alpha]_D^{20°\,C.} = +23.8°$ (c.=1.0 in dioxane)

EXAMPLE 3

*Estradiol-3-N-bis(β-chloroethyl)-carbamate-17-β-(para-propoxyphenyl)-propionate*

Analogously to Example 1, estradiol-3-N-bis-(β-chloroethyl)-carbamate-17-β-(para-propoxyphenyl) - propionate is obtained from 4.63 g. of estradiol-17-β-para-propoxyphenyl)-propionate and 3.08 g. N-chloroformyl-bis-(β-chloroethyl)-amine as an oil at room temperature.

$[\alpha]_D^{20°\,C.} = +31.2°$ (c.=1.0 in dioxane)

EXAMPLE 4

*Cortisone-21-N-bis(β-chloroethyl)-carbamate*

Analogously to Example 1, cortisone-21-N-bis-(β-chloroethyl)-carbamate is obtained from 1.80 g. of cortisone and 1.03 g. of N-chloroformyl-bis-(β-chloroethyl)-amine. This compound melts at 172.5–173.5° C. after recrystallization from methanol.

$[\alpha]_D^{20°\,C.} = +179.2°$ (c.=1.0 in dioxane)

EXAMPLE 5

*Prednisone-21-N-bis-(β-chloroethyl)-carbamate*

Analogously to Example 1, prednisone-21-N-bis-(β-chloroethyl)-carbamate is obtained from 5.37 g. of prednisone and 3.06 g. of N-chloroformyl-bis-(β-chloroethyl)-amine. This compound melts at 180–181° C. after recrystallization from methanol.

$[\alpha]_D^{20°\,C.} = +162.5°$ (c.=1.0 in dioxane)

EXAMPLE 6

*Prednisolone-21-N-bis-(β-chloroethyl)-carbamate*

Analogously to Example 1, prednisolone-21-N-bis-(β-chloroethyl)-carbamate is obtained from 5.40 g. of prednisolone and 3.06 g. of N-chloroformyl-bis-(β-cholroethyl)-amine. This compound melts at 179–180° C. after recrystallization from hexane.

$[\alpha]_D^{20°} C. = +109.7°$ (c.=1.0 in dioxane)

EXAMPLE 7

*Androsterone-3-N-bis-(β-chloroethyl)-carbamate*

To a solution of 7.05 g. of 17-chloroformic acid ester of androsterone in 85 ml. of dry chloroform is added a freshly produced solution of 6.25 g. of bis-(β-chloroethyl)-amine in 80 ml. of dry chloroform (produced from 7.85 g. of the hydrochloride of bis-(β-chloroethyl)-amine) while stirring and cooling with ice-water.

The reaction mixture must stand at room temperature for at least 6 hours under the exclusion of air humidity. The formed hydrochloride of bis-(β-chloroethyl)-amine is then filtered off, whereupon the chloroform solution is evaporated in vacuo to dryness.

The residue is the 3α-N-bis-(β-chloroethyl)-carbamate of androsterone. This compound melts at 109–110.5° C. after recrystallization from hexane.

$[\alpha]_D^{20°} C. = +57.4°$ (c.=1.0 in dioxane)

EXAMPLE 8

*Dehydroepiandrosterone-3-N-bis-(β-chloroethyl)-carbamate*

The above compound is obtained analogously to Example 7 from 3.51 g. of 3β-1chloroformic acid ester of dehydroepiandrosterone and 3.12 g. of bis-(β-chloroethyl)-amine (produced from 3.93 g. of the hydrochloride). The compound melts at 129–130.5° C. after recrystallization from aqueous acetone.

$[\alpha]_D^{20°} C. = +18.9°$ (c.=1.0 in dioxane)

EXAMPLE 9

*Estradiol-3-acetate-17-N-bis-(β-chloroethyl)-carbamate*

Analogously to Example 7, 17-N-bis-(β-chloroethyl)-carbamate of estradiol-3-acetate is obtained from 3.76 g. of 17-chloroformic acid ester of estradiol-3-acetate and 3.12 g. of bis-(β-chloroethyl)-amine (produced from 3.93 g. of the hydrochloride). The compound melts at 98–99° C. after recrystallization from hexane.

$[\alpha]_D^{20°} C. = +55.8°$ (c.=1.0 in dioxane)

EXAMPLE 10

*Estradiol-17β-N-bis-(β-chloroethyl)-carbamate*

To a solution of 0.5 g. potassium carbonate in 100 ml. aqueous methanol are added 1.44 g. estradiol-3-acetate-17β-N-bis-(β-chloroethyl)-carbamate (produced according to example 9) in a mixture of 65 ml. ethanol and 15 ml. acetone while stirring.

The reaction mixture is allowed to stand while stirring at a temperature of about 20° C. for half an hour and poured into 200 ml. of cold 0.1 N hydrochloric acid. After an hour, ethyl acetate is added and, after shaking the ethyl acetate solution is separated and washed with water, dried over sodium sulphate and evaporated in vacuo to dryness.

The residue is the 17β-N-bis-(β-chloroethyl)-carbamate of estradiol. The compound melts at 138–139° C. after recrystallization from aqueous methanol.

$[\alpha]_D^{20°} C. = +59.8°$ (c.=1.0 in dioxane)

EXAMPLE 11

*Androstane-3α,17β-bis-[N-bis-(β-chloroethyl)]-carbamate*

This compound is obtained analogously to Example 7 from 0.83 g. of 3α,17β-bis-chloroformic acid ester of androstane-3α,17β-diol and 1.25 g. of bis-(β-chloroethyl)-amine (produced from 1.57 g. of the hydrochloride). The compound melts at 87–88° C. after recrystallization from isopropyl ether.

$[\alpha]_D^{20°} C. = +31.9°$ (c.=1.0 in dioxane)

EXAMPLE 12

*Estradiol-3,17-bis-[N-bis-(β-chloroethyl)]-carbamate*

This compound is obtained analogously to Example 7 from 2.01 g. of 17β-chloroformic acid ester of estradiol-3-N-bis(β-chloroethyl)-carbamate and 1.25 g. of bis-(β-chloroethyl)-amine (produced from 1.57 g. of the hydrochloride).

The compound melts at 94.5–96.5° C. after recrystallization from isopropyl ether.

$[\alpha]_D^{20°}$ C.=+44.1° (c.=1.0 in dioxane)

EXAMPLE 13

*Estradiol-3-N-bis-(β-chloroethyl)-carbamate-17-propionate*

To a solution of 2.2 g. of 3-N-bis-(β-chloroethyl)- carbamate of estradiol (produced according to example 1) in 25 ml. of dry pyridine, 6.5 g. of propionic acid anhydride are added while stirring and cooling with ice-water. The reaction mixture is heated on a steam bath for 1½ hours under the exclusion of air humidity. After cooling, the surplus of propionic acid anhydride is hydrolyzed with crushed ice.

A mixture of equal parts of ether and ethyl acetate is added and, after shaking, the organic phase is separated, washed with water and dried over sodium sulphate, whereupon it is evaporated in vacuo to dryness. The residue is 3-N-bis-(β-chloroethyl)-carbamate-17-propionate of estradiol. This compound melts at 70–72° C. after recrystallization from aqueous methanol.

$[\alpha]_D^{20°}$ C.=+34.1° (c.=1.0 in dioxane)

EXAMPLE 14

*Estradiol-3-N-bis-(β-chloroethyl)-carbamate-17-trimethyl-acetate*

Analogously to Example 13, 3-N-bis-(β-chloroethyl)-carbamate-17-trimethylacetate of estradiol is obtained from 2.2 g. of 3-N-bis-(β-chloroethyl)-carbamate of estradiol (produced according to example 1) and 6 ml. of pivalic acid chloride. The compound melts at 90–92° C. after recrystallization from aqueous methanol.

$[\alpha]_D^{20°}$ C.=+33.5° (c.=1.0 in dioxane)

EXAMPLE 15

*Estradiol-3-N-bis-(β-chloroethyl)-carbamate-17-phosphate*

To a solution of 2.3 ml. of phosphorus oxychloride in 50 ml. of dry pyridine is added a solution of 2.2 g. of 3-N-bis-(β-chloroethyl)-carbamate of estradiol while stirring and at a temperature of about −10° C. The reaction mixture is allowed to stand at about 0° C. for one and a half hours, whereupon it is hydrolyzed by pouring it into ice water. The main part of the pyridine is evaporated in vacuo, whereupon the residue is poured into 100 ml. of cold 3.5 N hydrochloric acid with stirring. The precipitate thus obtained is isolated and washed with 0.1 N hydrochloric acid and water.

The compound, which consists of the 17-phosphate of estradiol-3-N-bis(β-chloroethyl)-carbamate, melts under decomposition at about 155° C. It is soluble in an aqueous solution of alkali.

$[\alpha]_D^{20°\,C.}$=+30.0° (c.=1.0 in dioxane)

EXAMPLE 16

*Estradiol-3-phosphate-17β-N-bis-(β-chloroethyl)-carbamate*

Analogously to Example 15, estradiol-3-phosphate-17β-N-bis-(β-chloroethyl)-carbamate is obtained from 2.6 g. of 17β-N-bis-(β-chloroethyl)-carbamate of estradiol (produced according to example 10) and 2.75 ml. of phosphorus oxychloride.

The compound melts under decomposition at about 125° C. It is soluble in an aqueous solution of alkali.

$[\alpha]_D^{20°\,C.}$=+49.9° (c=1.0 in chloroform)

EXAMPLE 17

*Androsterone-3α-N-bis-(β-bromoethyl)-carbamate*

The above compound is obtained analogously to Example 7, from 1.00 g. of androsterone-3α-chloroformic acid ester and 1.43 g of bis-(β-bromoethyl)-amine (produced from 1.94 g. of the hydrobromide).

The compound melts at 87.5–89° C. after recrystallization from isopropyl ether.

$[\alpha]_D^{20°\,C.}$=+56.7° (c.=1.0 in dioxane)

EXAMPLE 18

*Estradiol-3-acetate-17-N-bis-(β-bromoethyl)-carbamate*

Analogously to Example 7, the above compound is obtained from 1.25 g. of estradiol-3-acetate-17β-chloroformic acid ester and 1.68 g. of bis-(β-bromoethyl)-amine (obtained from 2.27 g. of the hydrobromide).

The compound melts at 95–96.5° C. after recrystallization from hexane.

$[\alpha]_D^{20°\,C.}$=+51.7° (c.=1.0 in dioxane)

EXAMPLE 19

*Estradiol-17-N-bis-(β-bromoethyl)-carbamate*

Analogously to Example 7, the above compound is obtained from 1.75 g. of estradiol-17-β-chloroformic acid ester and 2.66 g. of bis-(β-bromoethyl)-amine (obtained from 3.60 g. of the hydrobromide).

The compound melts at 149.5–151.5° C. after recrystallization from isopropyl ether + hexane (1:1), $[\alpha]_D^{20°\,C.}$=+66.3° (c.=1.0 in dioxane)

EXAMPLE 20

*Estradiol-3-N-bis-(β-chloroethyl)-17-N-bis-(β-bromoethyl)-dicarbamate*

Analogously to Example 7, the above compound is obtained from 2.00 g. of 17-chloroformic acid ester of estradiol-3-N-bis-(β-chloroethyl)-carbamate and 2.02 g. of bis-(β-bromoethyl)-amine (obtained from 2.73 g. of the hydrobromide).

The compound melts at 74–78° C. after recrystallization from aqueous isopropyl alcohol.

$[\alpha]_D^{20°\,C.}$=+25.2° (c.=1.0 in dioxane)

EXAMPLE 21

*Animal experiment*

The esters of the invention were tested for effectiveness in inhibiting the growth of Ehrlich's ascites tumour according to the procedure laid down in Cancer Chemother. Rep. (1959) 42–62. Administration was by the intraperitoneal route in each case. Some results obtained are given in Table 1.

TABLE 1

| Compound | Dose x days, mg./kg. | Lethality, percent | Tumour Weight treated/control, percent |
|---|---|---|---|
| Estradiol-3-N-bis-(β-chloroethyl)- carbamate | 5 x 155 | 0 | 42 |
| Do | 5 x 412 | 0 | 10 |
| Estradiol-3-N-bis-(β-chloroethyl)- carbamate-17β-phosphate | 5 x 66 | 0 | 42 |
| Do | 5 x 135 | 0 | 10 |
| Estradiol-3-N-bis-(β-chloroethyl)- carbamate-17β-propionate | 5 x 400 | 0 | 30 |

In table 2 the estrogenic effect of estradiol-3-N-bis-(β-chloroethyl)-carbamate is compared with that of estradiol-3-benzoate using the duration (in days) of cornified vaginal smears in spayed mice as an index of prolonged estrogenic activity. Each animal is injected with a single dose in oil. Ten animals are used in each group.

TABLE 2

| Compound | Dose in μg. steroid equiv. | Duration in days |
|---|---|---|
| Estradiol-3-benzoate | 8 | 8 |
| Do | 24 | 15 |
| Do | 72 | 18 |
| Estradiol-3-N-bis-(2-chloroethyl)-carbamate | 8 | 8 |
| Do | 24 | 15 |
| Do | 72 | 17 |

In table 3 the estrogenic effect of estradiol-3-N-bis-(2-chloroethyl)-carbamate-17-phosphate is compared with that of estradiol-17-phosphate using the weight of the uterus in spayed mice as an index of estrogenic activity four days after a single injection of a water solution of the sodium salts of the compounds. Ten animals are used in each group.

TABLE 3

| Compound | Dose in μg.steroid equiv. | Uterus weight in mg. |
|---|---|---|
| Estradiol-17-phosphate | 2 | 10 |
| Do | 10 | 13 |
| Estradiol-3-N-bis-(β-chlorethyl)-carbamate-17-phosphate | 2 | 19 |
| Do | 10 | 41 |

The high order of anti-tumour activity against Ehrlich's ascites tumour of the compounds of the present invention and compositions thereof is therefore evidenced by tests in lower mammals.

What we claim is:

1. Mono- and polyesters of estrogenic steroid hormones selected from the group consisting of estra-1,3,5(10)-triene-17β-ol, estra-1,3,5(10)-triene-3,17β-diol, estra-1,3,5(10) - triene-3,17α-diol, estra-1,3,5(10)-triene-3,17β-diol-16-one, estra-1,3,5(10)-triene-3,16α, 17β-triol, 17α-ethynyl-estra-1,3,5(10)-triene-3,17β-diol, estra-1,3,5 (10)-triene-3,17β - diol-3-methyl - ether, and estra-1,3,5 (10)-triene-3,17β - diol - 17-methylether, with N-bis-(β-haloethyl)-carbamic acid of the formula:

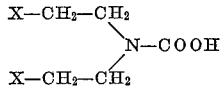

I wherein X is selected from the group consisting of chlorine and bromine, one or more remaining hydroxyl groups when present in the steroid nucleus being selected from the group consisting of free hydroxyl groups and hydroxyl groups esterified with an acid selected from the group consisting of aliphatic, cycloaliphatic and aromatic carboxylic acids, and inorganic polybasic acids.

2. The esters of claim 1, in which the sole acid moiety is N-bis-(β-haloethyl)-carbamic acid (compound I).

3. The esters of claim 1, in which the hormone is estradiol.

4. Estradiol-3-N-bis-(β-chloroethyl)-carbamate.

5. Estradiol-3,17-bis-N-bis-(β-chloroethyl)-carbamate.

6. Estradiol - 17 - phosphate - 3 - N - bis - (β - chloroethyl)-carbamate.

7. Estradiol - 3 - phosphate - 17 - N - bis - (β - chloroethyl)-carbamate.

8. Estradiol - 3 - N - bis - (β - chloroethyl) - carbamate-17-propionate.

9. Mono- and polyesters of androgenic steroid hormones selected from the group consisting of androstane-3α,17β-diol, androstane-3α-ol-17-one, androstane-3β-ol-17-one, androst-5-ene-3β-ol-17-one, and etiocholane-3α-ol-17-one, with N-bis-(β-haloethyl)-carbamic acid of the formula:

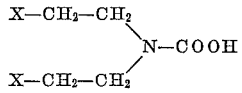

wherein X is selected from the group consisting of chlorine and bromine, one or more remaining hydroxyl groups when present in the steroid nucleus being selected from the group consisting of free hydroxyl groups and hydroxyl groups esterified with an acid selected from the group consisting of aliphatic, cycloaliphatic and aromatic carboxylic acids, and inorganic polybasic acids.

10. Mono- and polyesters of corticoid steroid hormones selected from the group consisting of pregnane-3α,20α-diol, pregn-5-ene-3β-ol-20-one, pregn-4-ene-17α, 21-diol-3,11 - 20 - trione, pregn-4-ene-11β,17α,21-triol-3,20-dione, pregn-4-ene-11β, 21-diol-3,20-dione, pregn-4-ene-21-ol-3, 11-20-trione, pregn-4-ene-21-ol-3,20-dione, pregn-1,4-diene-17α,21-diol-3,11,20-trione, pregna-1,4-diene-11β,17α, 21-triol-3,20-dione, 6α-methyl-pregna-1,4-diene-11β,17α, 21 - triol - 3,20 - dione, 9α-fluoro-pregn-4-ene-11β,17α,21-triol - 3,20 - dione, 6α9α-difluoro-pregn-1,4-diene-11β,16α, 17α,21-tetrol-3,20-dione and 16α-methyl-9α-fluoro-pregna-1,4-diene-11β,17α,21-triol-3,20-dione with N-bis(β-haloethyl)-carbamic acid of the formula:

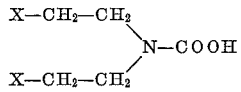

wherein X is selected from the group consisting of chlorine and bromine, one or more remaining hydroxyl groups when present in the steroid nucleus being selected from the group consisting of free hydroxyl groups and hydroxyl groups esterified with an acid selected from the group consisting of aliphatic, cycloaliphatic and aromatic carboxylic acids, and inorganic polybasic acids.

11. Estradiol - 3 - N - bis - (β - chloroethyl) - carbamate-17-lower-alkanoate.

12. Estradiol-17β-N-bis-(β-chloroethyl)-carbamate.

13. Estradiol-17-N-bis-(β-bromoethyl)-carbamate.

14. Estradiol - 3 - acetate - 17 - N - bis - (β - chloroethyl)-carbamate.

15. Estradiol - 3 - lower - alkanoate - 17 - N - bis - (β-chloroethyl)-carbamate.

16. Estradiol - 3 - acetate - 17 - N - bis - (β - bromoethyl)-carbamate.

17. Estradiol - 3 - lower - alkanoate - 17 - N - bis - (β-bromoethyl)-carbamate.

18. Estradiol - 3 - N - bis - (β - chloroethyl) - carbamate-17-trimethyl-acetate.

19. Estradiol - 3 - N - bis - (β - chloroethyl) - carbamate-17-acetate.

References Cited by the Examiner
UNITED STATES PATENTS
2,885,413 5/1959 Hogg et al. _____ 260—397.45
3,081,298 3/1963 Wettstein et al. ___ 260—239.55

OTHER REFERENCES
Loewenthal: Tetrahedron, vol. 6, pp. 269–303 (1959), pp. 299–302 relied on.

LEWIS GOTTS, *Primary Examiner*.

H. A. FRENCH, *Assistant Examiner*.